United States Patent [19]
Johnson

[11] 3,923,191

[45] Dec. 2, 1975

[54] WAFER BASKET AND HANDLE

[75] Inventor: Douglas M. Johnson, Carver, Minn.

[73] Assignee: Fluoroware, Inc., Chaska, Minn.

[22] Filed: Sept. 11, 1974

[21] Appl. No.: 504,903

[52] U.S. Cl. ............ 220/94 R; 16/114 R; 224/45 P; 294/16; 294/33
[51] Int. Cl.² ...................... B65D 25/28; B65G 9/00
[58] Field of Search ............ 294/15, 16, 27 R, 27 H, 294/28, 31 R, 33, 63 B, 90, 99 R; 16/110 A, 110.5, 114 R; 206/328, 334, 445; 220/22, 94 R; 224/45 F, 45 H, 45 P, 46 T, 46 R, 48 R; 229/52 A, DIG. 6

[56] References Cited
UNITED STATES PATENTS

| | | | |
|---|---|---|---|
| 2,156,274 | 5/1939 | Brown | 294/33 X |
| 2,541,511 | 2/1951 | Guzel | 294/99 R X |
| 2,612,401 | 9/1952 | Simmonds | 294/27 R |
| 2,638,490 | 5/1953 | Snyder | 294/16 X |
| 3,701,558 | 10/1972 | Baker | 294/99 R X |
| 3,861,733 | 1/1975 | Mey | 294/16 X |

Primary Examiner—Evon C. Blunk
Assistant Examiner—Johnny D. Cherry
Attorney, Agent, or Firm—James R. Haller; H. Dale Palmatier

[57] ABSTRACT

A wafer basket and an easily attachable and detachable handle having upright legs joined at their upper ends to arms and spaced to span and grip respective end walls of the basket. The basket end walls are provided near their upper ends with transverse slots adjacent the adjoining side walls, and the upright legs of the handle include transverse bars receivable within the slots. The end walls of the basket and the lower ends of the handle legs are provided with cooperating, confronting upright edges to restrain side-to-side movement of the handle with respect to the basket when the bars are inserted in the slots. The bars and slots co-act to support the basket at or near each of its four corners, and thus reduce or eliminate any side-to-side tipping of the basket.

5 Claims, 5 Drawing Figures

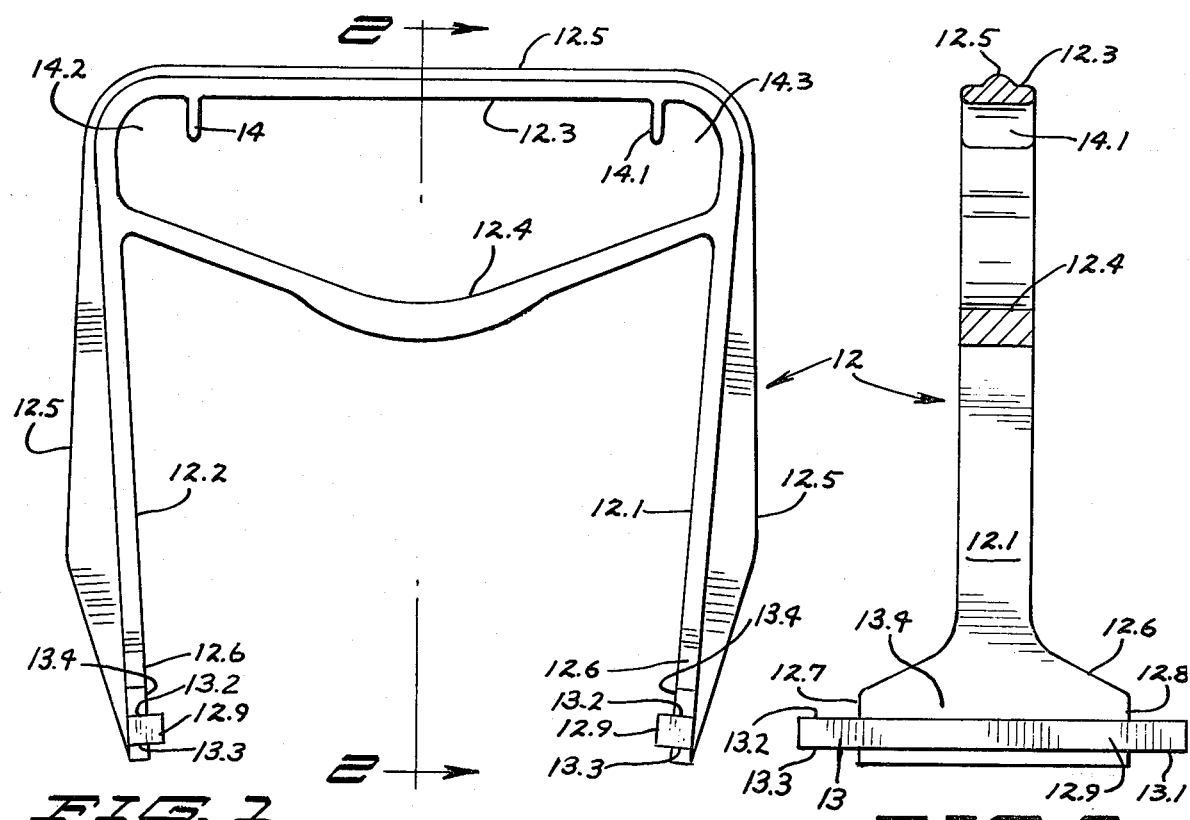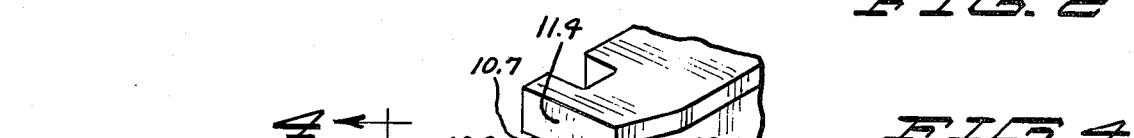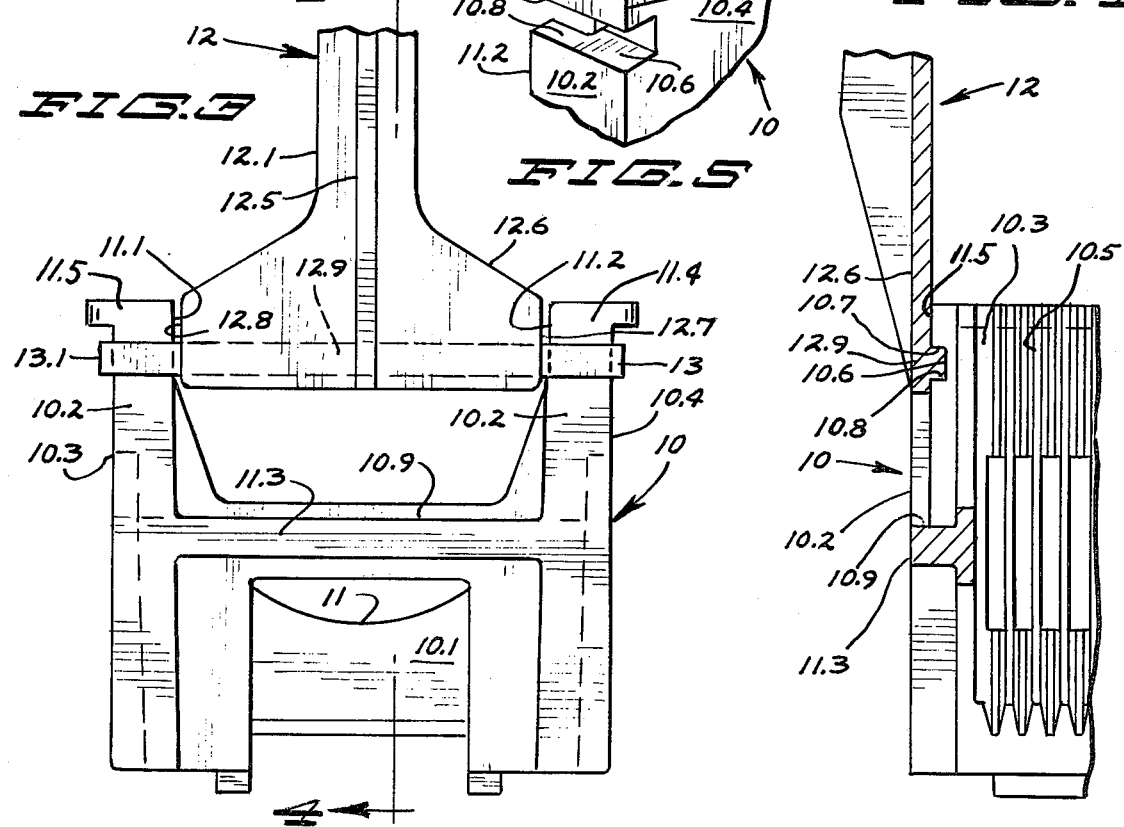

WAFER BASKET AND HANDLE

BACKGROUND OF THE INVENTION

Silicon wafers used in the semi-conductor industry often are processed by sequential contact with various corrosive chemicals. During such processing, the delicate wafers must be maintained scrupulously clean and must be very carefully handled to avoid breakage. Such wafers are ordinarily placed in wafer baskets which have side walls with spaced, vertical grooves between which the wafers are held in spaced, axially aligned orientation. To carry the wafer-laden baskets from one location to another, handles have been devised to grasp the wafer basket ends, one such handle being shown in U.S. Pat. No. 3,701,558. A handle grasping one end of a wafer basket is shown in commonly owned U.S. patent application Ser. No. 433,121, filed Jan. 14, 1974. It will be understood that as wafer-laden baskets are carried from location to location, it is important that the baskets be kept generally upright and remain firmly and desirably rigidly attached to the carrying handle; the connection between basket and handle should prevent side-to-side tipping of the basket with respect to the handle. Although the handle described in the above-mentioned patent yields acceptable results, an improvement of the attachment between basket and handle is desirable in order to further rigidify the connection and reduce the possibility of tipping of the basket with respect to the handle as the basket is transported from one position to another.

BRIEF DESCRIPTION OF THE INVENTION

The present invention provides a wafer basket and an easily attachable and detachable handle for the basket. The basket includes generally upright end walls joined by side walls configured to receive wafers therebetween. At least one and preferably both end walls of the basket are provided near their upper ends with transverse, outwardly open slots adjacent the adjoining side walls, and include spaced, upright edges. The handle includes a pair of stiff, upright legs spaced to span the basket end-to-end, and includes leg manipulating means comprising a pair of elongate and stiff but resiliently flexible arms extending between and joining upper ends of the legs and normally urging the legs inwardly against the end walls of the basket. The arms are mutually oriented and spaced to produce outward swinging of the lower ends of the legs when one of the arms if flexed towards the other, as by hand. At their lower ends, the legs include basket gripping means of which at least one and preferably both comprise a transverse bar receivable within the transverse slots in the basket end wall. A portion of the lower end of the leg includes a pair of upright edges confronting and engageable with upright edges of the basket end wall and oriented to restrain side-to-side movement of the handle with respect to the basket. The bar at the lower end of the handle, which is received within the slots in the basket end wall, restrains the basket from tipping from side-to-side.

BRIEF DESCRIPTION OF THE DRAWING

FIG. 1 is a side view of a handle of the invention, depicted without a basket and in its relaxed, or normal position;

FIG. 2 is a cross-sectional view of the handle taken along line 2—2 of FIG. 1;

FIG. 3 is an end view, partially broken away, of the handle of FIG. 1 in contact with and gripping the end wall of a basket of the invention;

FIG. 4 is a cross-sectional, broken away view taken along line 4—4 of FIG. 3; and FIG. 5 is a broken away, perspective view of an upper corner of a basket end wall.

DETAILED DESCRIPTION OF THE PREFERRED EMBODIMENT

Referring first to FIGS. 3–5, the basket employed in the present invention is designated generally as 10 and is provided with generally upright end walls 10.1, 10.2 joined by side walls 10.3, 10.4. The side walls are each provided with a series of inwardly extending, aligned ribs 10.5 which are spaced to receive between them and carry a series of wafers (not shown). Near their top edges, the end walls 10.1 and 10.2 are provided at their junctures with the abutting side walls 10.3, 10.4 with transverse, aligned slots 10.6, as best shown in FIG. 5.

The slots 10.6 desirably are generally rectangular in shape and have substantially flat upper and lower walls 10.7, 10.8. Thus, slots which are transverse of the axis of the basket are provided at each of its four corners near its top. The end walls 10.1, 10.2 have central, downwardly extending recesses, the recess in end wall 10.2 being designated generally 10.9 and the recess in the other end wall 10.1 being designated 11 in FIG. 3. Reference is made to my copending, commonly owned application Ser. No. 504,904 entitled Reinforced Wafer Basket filed Sept. 11, 1974 for details of the construction of a basket employable in the present invention. The recesses 10.9, 11 provide the end walls with spaced end wall sections 11.4, 11.5 (FIG. 3) having generally vertical, inwardly facing, opposed edges 11.1, 11.2, the purpose of which will be subsequently explained. The end wall 10.2 of the basket may be provided with an indexing bar 11.3 for adapting the basket for use with certain automated processing equipment, and the recess 11.1 on the other end of the basket may be generally U-shaped to permit access to wafers in the basket axially from that end.

The handle 12 of the present invention is shown best in FIGS. 1 and 2 and comprises a pair of upright legs 12.1, 12.2, and a pair of transverse connecting arms 12.3, 12.4 mounted between the legs at their upper ends. The legs 12.1, 12.2 are desirably of flat, rigid plastic material which merge at their upper ends into the arm 12.3, as depicted in FIG. 1. The handle includes an external stiffening rib 12.5 which extends longitudinally of the legs and about the arm 12.3. As shown best in FIG. 1, the lower arm 12.4 is curved downwardly towards its center, and is spaced below the arm 12.3, with the ends of the arm 12.4 being joined to the legs at points spaced below the junction of the legs with the upper arm 12.3. The upper and lower arms 12.3 and 12.4 are of sufficient flexibility so that one or both of these arms may be flexed towards the other when the arms are squeezed together, as by hand. As the arm 12.3 is flexed downwardly near its center, or as the arm 12.4 is straightened by flexing upwardly near its center, the legs 12.1, 12.2 of the handle tend to separate. When squeezing force is removed from the arms, the legs are normally drawn into the position shown in FIG. 1 by the resiliency of the handle. It will be understood that when the legs are spread apart, the resilient, elastic nature of the handle urges the bottom ends of the legs together toward and against the end walls of a basket between the legs, the distance separating end walls of the basket being such that the attached handle legs are substantially vertical and parallel to each other.

The bottom ends of the legs 12.1 and 12.2 are flared outwardly to define inwardly facing plates 12.6 having vertical side edges 12.7, 12.8 (FIGS. 2, 3) spaced to fit between the opposed, confronting side edges 11.1, 11.2 of the end walls 10.1, 10.2 of a basket. The plates 12.6 are provided at their confronting, inner or front surfaces 13.4 with transverse bars 12.9 which extend through the thicknesses of the plates as shown in FIG. 1. The bar also extends transversely beyond the side edges 12.7, 12.8 of the plate to provide bar projections 13, 13.1 respectively. The bar is desirably of generally rectangular cross-section, as shown in FIGS. 1 and 4, and the outwardly extending bar projections 13, 13.1 are dimensioned to fit snuggly within the slots 10.6 formed in the end walls of the wafer basket.

A pair of downwardly extending projections 14, 14.1 are provided on the under surface of the handle arm 12.3 adjacent the ends of that arm, the projections serving to provide constricted recesses 14.2, 14.3 between the arms 12.3 and 12.4 and adjacent the handle legs. Hanging hooks or other projections can be inserted through the recesses to permit the handle carrying a basket to be suspended from a wall or the like.

To attach the handle 12 to a basket 10, the arms 12.3, 12.4 of the handle 12 are squeezed one toward the other to separate the handle legs 12.1, 12.2, and the ends of the handle are oriented adjacent the outer surfaces of the end walls 10.1, 10.2 of the basket with the extended bar ends 13, 13.1 in alignment with the slots 10.6 of the basket. The squeezing pressure on the handle arms 12.3, 12.4 is then removed, and the ends of the handle legs spring together, the bar projections 13, 13.1 being snuggly received in the basket slots 10.6 and the vertical edges 12.7, 12.8 of the handle plate 12.6 being received between the opposed vertical edges 11.2, 11.1 of the basket end walls, respectively. The top and bottom surfaces 13.2, 13.3 of the bars 12.9 (FIG. 2) co-act with the top and bottom surfaces 10.7, 10.8 of the slots to hold the bar rigidly in the slots and to restrain tilting of the handle in direction parallel to the axis of the basket. With the handle in its basket-grasping position as shown in FIGS. 3 and 4, the vertical edges of 12.7, 12.8 of the handle legs co-act with the adjacent, vertical edges 11.1, 11.2 of the basket end walls to restrain the handle from moving from side-to-side with respect to the basket. The firm inward grip of the handle legs with the end walls of the basket is maintained by the springy, resilient nature of the handle, as above described.

Since wafer basket handles may be interchanged between baskets, and may hence become a source of contamination for individual baths, in the present invention the handle contacts the basket only near the upper ends of the basket so that the handle is only shallowly immersed in a processing liquid. Moreover, location of the handle only at the top portion of the basket, as herein described, permits the lower portion of the basket to be placed in an appropriate centrifuge when the wafers within the basket are to be subjected to centrifugal force during processing.

The handle and the basket both preferably are molded as integral units from a temperature and chemical resistant plastic such as "Teflon" PFA Fluorocarbon resin, a perfluoroalkoxy-substituted polytetrafluoroethylene-type resin sold by the DuPont Company.

It will be understood that the ends of the bar projections 13, 13.1 may be provided with projections extending normal to the bar axis and parallel with the axis of the basket to co-act with outer surfaces of the basket end walls to likewise prevent the handle from moving from side-to-side. Other configurations making use of the bar projections 13, 13.1 and slots 10.6 may now also become apparent to permit co-action between abutting, vertical side edges of the handle legs and the end walls of the basket, respectively, to prevent relative side-to-side movement of the handle and basket.

Thus, manifestly I have provided a handle for a wafer basket which supports the basket at each of its four corners and near its top, which is easily attachable to and detachable from a basket, and which, when attached to a basket, restrains the basket from tipping sideways with respect to the handle.

What is claimed:

1. In combination, a wafer basket and an easily attachable and detachable handle therefor, the basket having generally upright side and end walls and an open top, the end walls having their upper surfaces centrally recessed to provide each wall with spaced, upright, opposing edges, each wall having aligned, outwardly open transverse slot closely adjacent the top of the basket and the junctures of the end and side walls; and the handle having a pair of stiff, upright legs and leg manipulating means joining upper ends of the legs and spacing the legs to span the basket end-to-end, each leg including at its lower end basket gripping means comprising a transverse bar receivable in the transverse slots of the respective end wall of the basket, the lower end of the leg including upright edges oriented with respect to the transverse bar to confront the upright edges of the basket end wall when the transverse bar is seated in the slot to restrain side-to-side movement of the handle with respect to the basket, the transverse bars of the legs engaging the slots adjacent the upper corners of the basket to stably lift and support the basket.

2. The basket and handle of claim 1 wherein the lower end of the leg of the handle includes a plate with side edges receivable between and confronting the opposing edges of the side wall, the transverse bar being carried by the plate and having ends extending transversely of the plate for reception in the slots adjacent the upper corners of the basket.

3. The basket and handle of claim 1 wherein the leg manipulating means comprises a pair of elongate and stiff but resiliently flexible arms extending between upper ends of the handle legs and resiliently urging the legs inwardly against the end walls of the basket, the arms being mutually oriented and spaced to produce outward swinging of the legs when one of the arms is flexed toward the other.

4. The basket and handle of claim 1 wherein the slot in the basket end wall and the transverse bar of the handle are generally rectangular in cross section and have mating respective upper and lower surfaces to restrain tilting of the handle axially of the basket.

5. In combination, a wafer basket and an easily attachable and detachable handle therefor, the basket having generally upright side and end walls and an open top and bottom, the end walls each having a central, downwardly extending recess therein defining spaced end wall sections adjacent the side walls and having upright, spaced inner edges, the end wall sections of each end wall having aligned, outwardly open, generally rectangular slots therein closely adjacent the upper corners of the basket; the handle comprising a pair of stiff, upright legs joined at their upper ends by elongate and stiff but resiliently flexible arms normally urging lower ends of the legs toward each other, the arms being mutually oriented and spaced to produce outward swinging of lower ends of the legs to span the basket end-to-end when one of the arms is flexed toward the other, the lower ends of the legs each having a plate having upright side edges received between and confronting the spaced, inner edges of the respective recessed end wall and carrying a transverse bar with ends of generally rectangular cross section extending from the plate edges for reception in and co-action with the aligned slots in the respective basket end wall to resist tilting of the handle longitudinally of the basket.

* * * * *